(12) United States Patent
Durvasula et al.

(10) Patent No.: US 10,498,636 B2
(45) Date of Patent: *Dec. 3, 2019

(54) VERY SMALL APERTURE TERMINAL INCLUDING CELL SITE COMPONENTS, AND A SYSTEM

(71) Applicants: Bhanu Durvasula, Potomac, MD (US); Gaguk Zakaria, College Park, MD (US)

(72) Inventors: Bhanu Durvasula, Potomac, MD (US); Gaguk Zakaria, College Park, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/489,990

(22) Filed: Apr. 18, 2017

(65) Prior Publication Data
US 2018/0205449 A1 Jul. 19, 2018

Related U.S. Application Data

(60) Provisional application No. 62/448,298, filed on Jan. 19, 2017.

(51) Int. Cl.
*H04W 4/00* (2018.01)
*H04L 12/725* (2013.01)
(Continued)

(52) U.S. Cl.
CPC ......... *H04L 45/306* (2013.01); *H04B 7/1853* (2013.01); *H04B 7/18528* (2013.01);
(Continued)

(58) Field of Classification Search
CPC ........... H04B 7/18513; H04B 7/18539; H04W 28/0205
See application file for complete search history.

(56) References Cited

U.S. PATENT DOCUMENTS 8,208,421 B2 * 6/2012 Dankberg .......... H04B 7/18582
370/310
8,386,175 B2 * 2/2013 Limbaugh ............ G08G 5/0013
340/961

(Continued)

FOREIGN PATENT DOCUMENTS

EP 1850605 A1 10/2007
WO 2014153443 A1 9/2014

OTHER PUBLICATIONS

Non-final office action in U.S. Appl. No. 15/489,962, notification dated May 23, 2018.

(Continued)

*Primary Examiner* — Shantell L Heiber
(74) *Attorney, Agent, or Firm* — Capitol City Techlaw; Jasbir Singh

(57) ABSTRACT

A Very Small Aperture Terminal (VSAT) and cellular system to provide backhaul satellite communications for a cellular base station are disclosed. The VSAT including an Evolved Packet Core (EPC) Core Network (CN) device; and a satellite modem connected to the EPC CN device and to communicate over a satellite link, wherein the EPC CN device manages communication of user traffic from the cellular base station to the satellite modem.

17 Claims, 5 Drawing Sheets

(51) Int. Cl.
*H04Q 11/04* (2006.01)
*H04L 12/707* (2013.01)
*H04Q 3/00* (2006.01)
*H04W 28/08* (2009.01)
*H04L 12/64* (2006.01)
*H04W 36/22* (2009.01)
*H04L 12/715* (2013.01)
*H04B 7/185* (2006.01)
*H04L 29/06* (2006.01)
*H04W 84/04* (2009.01)
*H04W 84/06* (2009.01)
*H04W 88/08* (2009.01)
*H04W 36/00* (2009.01)
*H04W 8/04* (2009.01)
*H04W 8/20* (2009.01)
*H04W 60/04* (2009.01)

(52) U.S. Cl.
CPC .......... *H04L 12/6402* (2013.01); *H04L 45/04* (2013.01); *H04L 45/22* (2013.01); *H04L 65/104* (2013.01); *H04L 65/1006* (2013.01); *H04L 65/1016* (2013.01); *H04L 65/1073* (2013.01); *H04Q 3/0029* (2013.01); *H04Q 11/0478* (2013.01); *H04W 28/08* (2013.01); *H04W 36/22* (2013.01); *H04W 8/04* (2013.01); *H04W 8/20* (2013.01); *H04W 36/0055* (2013.01); *H04W 60/04* (2013.01); *H04W 84/045* (2013.01); *H04W 84/06* (2013.01); *H04W 88/08* (2013.01)

(56) References Cited

U.S. PATENT DOCUMENTS

| | | | |
|---|---|---|---|
| 9,504,079 B2* | 11/2016 | Zhang | H04W 76/12 |
| 2001/0000137 A1 | 4/2001 | Ravishankar et al. | |
| 2009/0097462 A1 | 4/2009 | Ganley et al. | |
| 2009/0129310 A1 | 5/2009 | Bruemmer et al. | |
| 2011/0141947 A1* | 6/2011 | Li | H04M 3/2281 370/259 |
| 2011/0280178 A1* | 11/2011 | Heifner | H04B 7/185 370/325 |
| 2013/0077562 A1 | 3/2013 | Boltz et al. | |
| 2014/0016531 A1* | 1/2014 | Yun | H04W 76/40 370/312 |
| 2014/0071818 A1 | 3/2014 | Wang et al. | |
| 2014/0269613 A1 | 9/2014 | Tiwari et al. | |
| 2015/0063346 A1 | 3/2015 | Eswara et al. | |
| 2015/0124616 A1 | 5/2015 | Lohman et al. | |
| 2015/0223133 A1 | 8/2015 | Stojanovski et al. | |
| 2015/0237587 A1 | 8/2015 | Livergood | |
| 2015/0382240 A1 | 12/2015 | Hecht et al. | |
| 2016/0006500 A1* | 1/2016 | Radpour | H04B 7/18539 370/319 |
| 2016/0028472 A1* | 1/2016 | Valencia | H04B 7/18513 370/316 |
| 2016/0192235 A1 | 6/2016 | Ahluwalia et al. | |
| 2017/0171566 A1 | 6/2017 | Liu et al. | |
| 2017/0229013 A1 | 8/2017 | Bernhardt et al. | |
| 2017/0230877 A1 | 8/2017 | Claassen et al. | |
| 2018/0013486 A1* | 1/2018 | Irani | H04B 7/18521 |
| 2018/0110064 A1 | 4/2018 | Stojanovski et al. | |

OTHER PUBLICATIONS

Final office action in U.S. Appl. No. 15/489,962, notification dated Dec. 20, 2018.

International Search Report for PCT/US2018/014377 dated Jun. 25, 2018.

International Search Report for PCT/US2018/014386 dated Jun. 25, 2018.

Non final office action dated Jun. 18, 2019 for U.S. Appl. No. 15/489,962.

* cited by examiner

VERY SMALL APERTURE TERMINAL INCLUDING CELL SITE COMPONENTS, AND A SYSTEM

FIELD

The present teachings disclose integration of cellular and satellite backhaul components at a cell site to enhance the user experience, call setup times and latency. The present teachings disclose also support local switching of voice calls at the cell site and flexibility to efficiently route voice and data traffic to different locations, geographic regions, countries or the like. The present teachings minimize costs to operators as well as end users.

BACKGROUND

In the prior art, cellular and satellite backhaul components at a cell site are separate and require lots of man-hours, customization and costs to setup for LTE networks. Integration of these components enhances the call setup times, latency, and supports local switching of voice calls at an LTE cell site, reduces foot print of equipment at the cell site, provides ease of provisioning equipment.

LIST OF ABBREVIATIONS

| | |
|---|---|
| APN | Access Point Name |
| CN | Core Network |
| CDR | Call Data Record |
| DSCP | Differentiated Services Code Point |
| eNB | Evolved Node B |
| EPC | Evolved Packet Core |
| GW | Gateway |
| HSS | Home Subscriber Server |
| IMS | IP Multimedia Sub-system |
| IP | Internet Protocol |
| LTE | Long Term Evolution |
| MGW | Media gateway |
| MME | Mobility Management Entity |
| NFV | Network Functions Virtualization |
| PCRF | Policy and Charging Rules Function |
| PDN | Packet Data Network |
| PGW | PDN Gateway |
| PSTN | Public Switch Telephone Network |
| SGW | Serving Gateway |
| SIP | Session Initiation Protocol |
| TRX | Transceiver (transmitter/receiver) |
| UT | User Terminal |
| VSAT | Very Small Aperture Terminal |
| VoLTE | Voice over LTE |

FIG. 1 illustrates a prior art cellular system.

A typical LTE cellular system 100 is shown in FIG. 1. The Evolved Packet Core (EPC) Core Network (CN) includes an MME (or MMEs), a Serving Gateway (SGW) and a PDN (Packet Data Network) Gateway (PGW). An Enhanced Node B (eNB) communicates with an MME for signaling and a Serving Gateway (SGW) for user traffic. All User Terminal (UT) traffic goes through the SGW/PGW to its destination. The traffic from the UT (user traffic) may include voice traffic and data traffic. The PGW forwards voice traffic to a Media Gateway (MGW), in the IP Multimedia Subsystem (IMS), that provides communications with a Public Switched Telephone Network (PSTN). The PGW forwards the data traffic to an external network, such as the Internet.

3GPP standardizes the all-IP network called Long Term Evolution (LTE) cellular network. LTE provides faster rate than its predecessor such as a 3G cellular network. In LTE, all user traffic, namely voice and data, is carried as IP traffic. The LTE core network is called Evolved Packet Core (EPC). EPC includes myriad functions, such as, a serving gateway (SGW) to connect to the access network, i.e., eNB; a packet gateway (PGW or sometimes PDN-GW) to interconnect to the external IP networks such as the Internet and an IP multimedia subsystem (IMS); a mobility management entity (MME) to deal with the control plane and signaling; and the home subscriber server (HSS) to facilitate subscriber-related information. The connection between PGW and external IP network is provided by the SGi interface.

Cellular backhaul over a satellite backhaul provides connectivity of cell tower traffic in underserved areas (rural locations, islands, etc.) to telephone and internet networks deployed in centrally developed locations (urban locations, cities, etc.). Due to the delay incurred over the satellite backhaul and limited radio resources, the user experience for voice and data traffic over the satellite backhaul as compared to low latency and high bandwidth terrestrial links is inferior.

FIG. 2 illustrates a prior art cellular system using a satellite backhaul as backhaul carrier.

A prior art cellular system 200 may include a satellite backhaul 210 as a backhaul carrier. In system 200, the traffic between the eNB and the EPC is carried as backhaul traffic using the satellite backhaul 210 including a Very Small Aperture Terminal (VSAT), a satellite, and a VSAT Gateway (VSAT GW). The eNB is connected to the VSAT and the EPC is connected to a VSAT GW to provide connectivity. In the network configuration of FIG. 1 and FIG. 2, the PGW filters all UT traffic and send it to a specific destination, for example, voice and its associated signaling is sent to an MGW and data and its associated signaling is sent to the Internet.

The present teachings disclose integration of cellular and satellite backhaul components at a cell site to enhance the user experience with respect to call setup times and latency. The present teachings also disclose local switching of voice calls, for example, at an LTE cell site. The present teachings also disclose flexibility to efficiently route voice and data traffic to different locations or geographic regions (e.g., different countries) to minimize costs to operators as well as end users.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

A Very Small Aperture Terminal (VSAT) to provide backhaul satellite communications for a cellular base station is disclosed. The VSAT including an Evolved Packet Core (EPC) Core Network (CN) device; and a satellite modem connected to the EPC CN device and to communicate over a satellite link, wherein the EPC CN device manages communication of user traffic from the cellular base station to the satellite modem.

A cellular system using backhaul satellite communications is disclosed. The cellular system including a cellular base station; and a Very Small Aperture Terminal (VSAT) including an Evolved Packet Core (EPC) Core Network (CN) device, and a satellite modem connected to the EPC CN device and to communicate over a satellite link. In the cellular system, the cellular base station is connected to the VSAT, and the EPC CN device manages communication of user traffic from the cellular base station to the satellite modem.

A Very Small Aperture Terminal (VSAT) to provide backhaul satellite communications is disclosed. The VSAT includes an evolved Node B (eNB); and a satellite modem connected to the eNB and to communicate over a satellite link, wherein the eNB communicates signaling and user traffic to the satellite modem.

Additional features will be set forth in the description that follows, and in part will be apparent from the description, or may be learned by practice of what is described.

DRAWINGS

In order to describe the manner in which the above-recited and other advantages and features may be obtained, a more particular description is provided below and will be rendered by reference to specific embodiments thereof which are illustrated in the appended drawings. Understanding that these drawings depict only typical embodiments and are not, therefore, to be considered to be limiting of its scope, implementations will be described and explained with additional specificity and detail through the use of the accompanying drawings.

The present teachings disclose a satellite backhaul that provides the flexibility to carry the LTE traffic from a user terminal (UT) to different geographic locations or countries based on the traffic type. For example, Voice traffic is routed locally within the country to avoid long distance or international billing charge and data traffic is routed to a foreign country that already has the Internet infrastructure.

Figure 1:
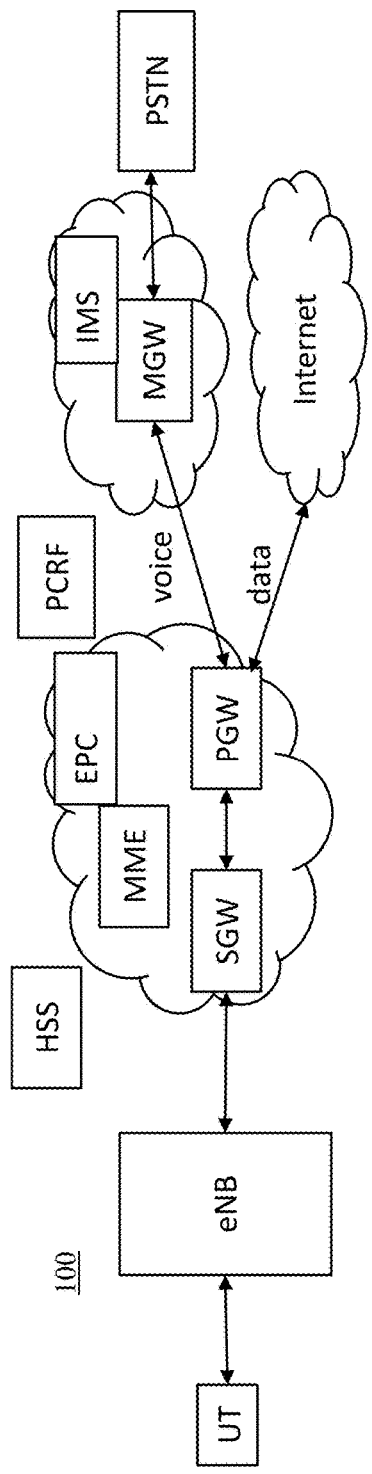
FIG. 1 illustrates a prior art cellular system.
Figure 2:
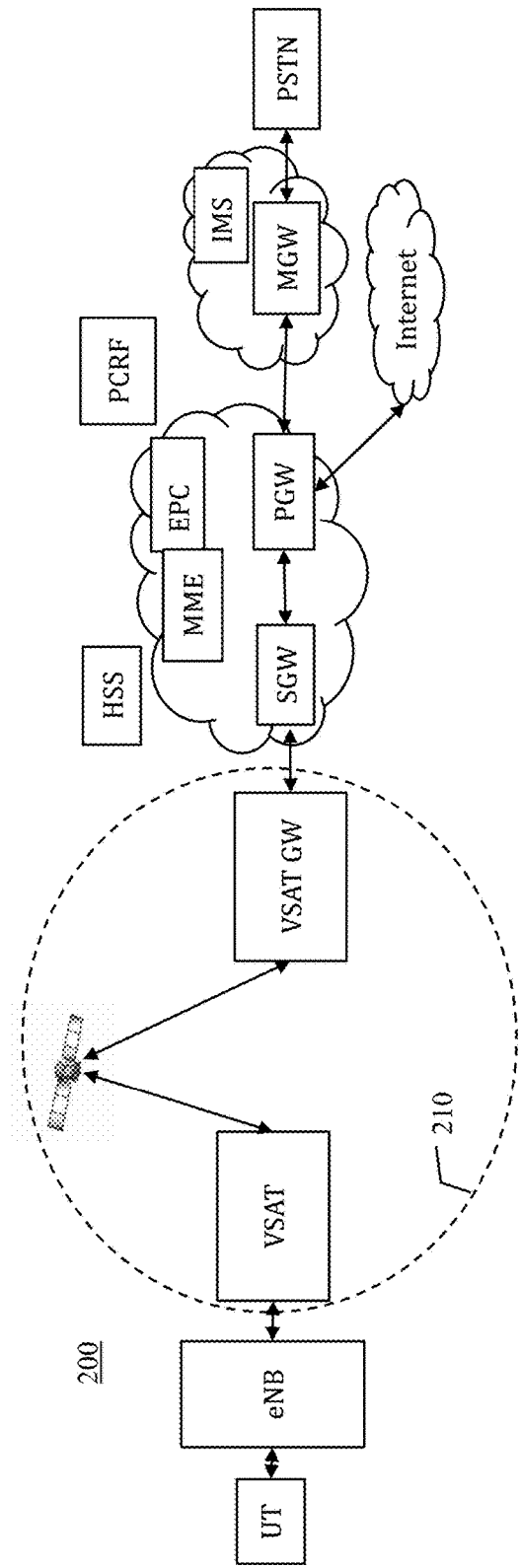
FIG. 2 illustrates a prior art cellular system using a satellite backhaul as a backhaul carrier.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure.

The terminology used herein is for describing particular embodiments only and is not intended to be limiting of the present disclosure. As used herein, the singular forms "a," "an" and "the" are intended to include the plural forms as well, unless the context clearly indicates otherwise. Furthermore, the use of the terms a, an, etc. does not denote a limitation of quantity but rather denotes the presence of at least one of the referenced item. The use of the terms "first," "second," and the like does not imply any particular order, but they are included to either identify individual elements or to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Although some features may be described with respect to individual exemplary embodiments, aspects need not be limited thereto such that features from one or more exemplary embodiments may be combinable with other features from one or more exemplary embodiments.

Introduction

The present teachings disclose integration of cellular and satellite backhaul components at a cell site to enhance the user experience with respect to call setup times and latency. The present teachings also disclose local switching of voice calls, for example, at an LTE cell site. The present teachings also disclose flexibility to efficiently route voice and data traffic to different locations or geographic regions (e.g., different countries) to minimize costs to operators as well as end users.

In various embodiments, the present teachings disclose multiple integration options including, without limitation:

VSAT with EPC components (MME, SGW, PGW) and PCRF;

SAT with eNB, EPC components (MME, SGW, PGW) and PCRF; and

Dual transceivers at the VSAT for applications that require VSAT to communicate with two gateways (e.g. separation of voice and data traffic)

In certain conditions, it is very difficult to connect a cellular network base station or Enhanced Node B (eNB), for example, an LTE eNB, to its Core Network (CN). The difficult conditions may include a distance to the core network, right-of-way to the core network, the terrestrial landscape or the like. For difficult conditions, a satellite backhaul is a viable solution to carry traffic between eNB and the CN. Satellite communication network for LTE backhaul includes a VSAT and a VSAT Gateway (GW) where the eNB is connected to the VSAT terminal and the CN is connected to the VSAT GW.

The present teachings disclose multiple network designs where the traffic from an eNB is routed to two different geographic regions, locations or countries based on the traffic type. Similarly, traffic from two different geographic locations or countries is routed to an eNB based on the traffic type.

The procedures and messages described here are based on well-known and widely deployed 3GPP standard. As such, the present teachings reference the standards and do not disclose special signaling such as signaling for Specific IP Traffic Offload (SIPTO) or signaling for Local IP access (LIPA).

Integration of EPC Functionality at the VSAT

Network Functions Virtualization (NFV) of the LTE Core Network (CN) functions allows implementations of CN functions in small footprint servers and processor units rather than racks of CN equipment. A cell site in a cellular system including a satellite backhaul network may serve few hundred to few thousand users at User Terminals (UTs). In such a cellular system, the shifting of the EPC CN functions to the cell site has several advantages. Under NFV, the MME, SGW, PGW and PCRF functions may be affordably implemented. Furthermore, the MME, SGW, PGW or PCRF may be selectively enabled or disabled independently per a network design.

Figure 3:
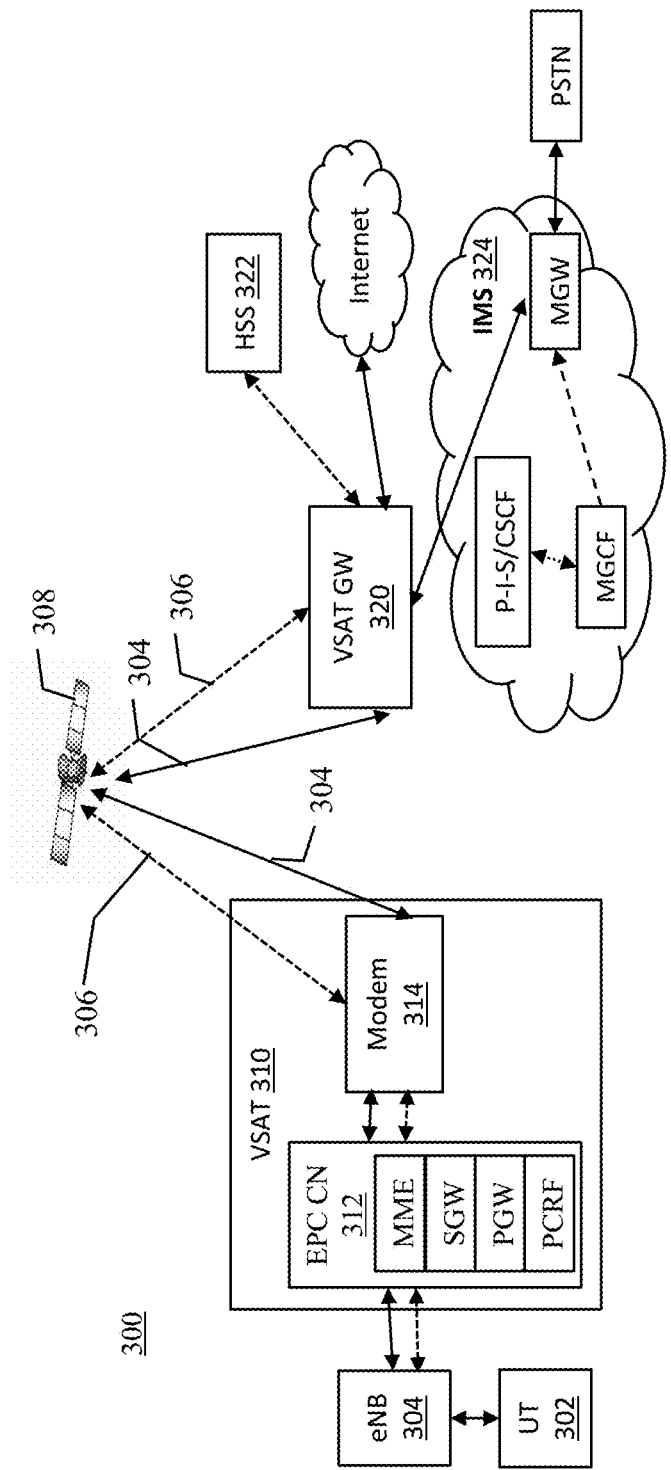
FIG. 3 illustrates EPC functionality integrated into a VSAT according to various embodiments.

FIG. 3 illustrates a cellular system including an EPC CN device integrated into a VSAT according to various embodiments.

A cellular system 300 may provide cellular services to a User Terminal (UT) 302 connecting to an enhanced Node B (eNB) 304. The eNB 304 may connect to a VSAT 310. In FIG. 3, signaling traffic is illustrated by dashed lines and user traffic is illustrated by solid lines. The VSAT 310 may be disposed at a cell site. The VSAT 310 may include an EPC CN device 312 and a modem 314. The modem 314 may be used for providing a satellite backhaul for the cell-site. The satellite backhaul may provide one or more satellite links 304, 306 using a satellite 308 as a relay to connect the modem 314 with a VSAT GW 320. The EPC CN device 312 may provide one or more of an MME, an SGW, a PGW, a PCRF or the like.

In exemplary embodiments, the VSAT GW 320 may provide voice traffic services for the UT 302 by communicating with an IMS 324. The IMS 324 may connect to a PSTN. In exemplary embodiments, the VSAT GW 320 may provide data access for the UT 302 subscriptions by communicating with an HSS 322. In exemplary embodiments, the VSAT GW 320 forwards the signaling between various functions included in the EPC CN device 312 and the IMS or the HSS 322. In exemplary embodiments, the VSAT GW 320 forwards the signaling between an MME included in the EPC CN device 312 and the HSS 322 to access UT subscriptions stored in the HSS 322. In exemplary embodiments, the VSAT GW 320 may provide data access for the UT 302 by communicating with the Internet.

Integration of eNodeB Functionality at the VSAT

Figure 4:
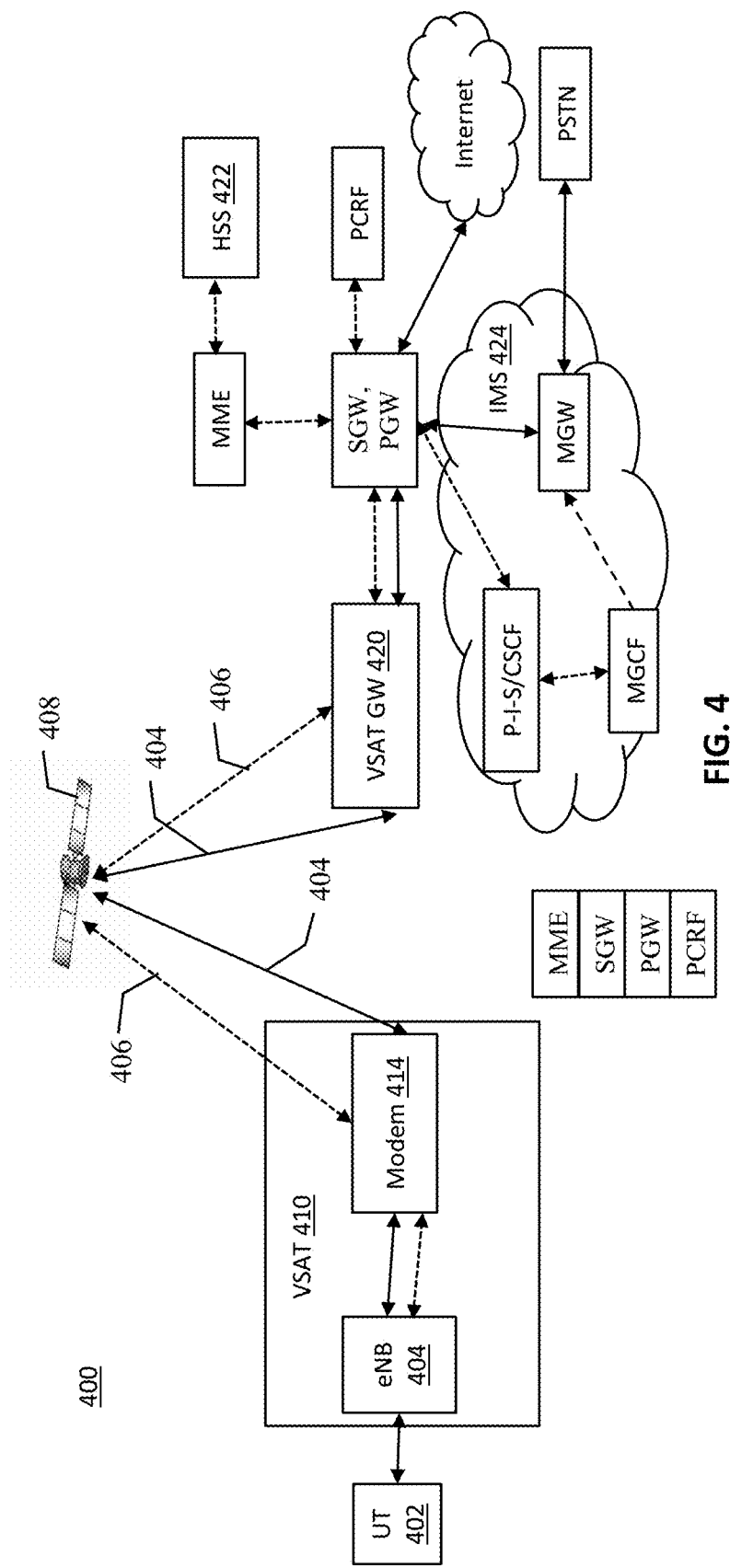
FIG. 4 illustrates eNB Functionality Integrated into a VSAT according to various embodiments.

FIG. 4 illustrates a cellular system including an eNB integrated into a VSAT according to various embodiments.

A cellular system 400 may provide cellular services to a User Terminal (UT) 402 connecting to an eNB 404, for example, a small-cell eNB. In some embodiments, the eNB 404 may be integrated into a VSAT 410 with a modem 414. In FIG. 4, signaling traffic is illustrated by dashed lines and user traffic is illustrated by solid lines. The modem 414 may be used for providing a satellite backhaul for the cell-site. The satellite backhaul may provide one or more satellite links 404, 406 using a satellite 408 as a relay to connect the modem 414 with a VSAT GW 420. The integrated VSAT 410 may be standalone and may communicate with external EPC CN functions using the modem 414 and the VSAT GW 420. The EPC CN functions may include one or more of an MME, an SGW, a PGW, a PCRF or the like. In some embodiments, the eNB 404 may communicate with the EPC CN functions without traversing over the satellite link provided by the modem 414 (not shown).

In exemplary embodiments, the VSAT GW 420 may provide voice traffic services for the UT 402 by communicating with an IMS 424. The IMS 424 may connect to a PSTN. In exemplary embodiments, the VSAT GW 420 forwards the signaling between the eNB 404 and various functions of the EPC CN device 412. In some embodiments, the VSAT GW 420 forwards the signaling between the eNB 404 and an MME function of the EPC CN device 412 to access UT subscriptions stored in the HSS 422. In exemplary embodiments, the VSAT GW 420 may provide data access for the UT 402 by communicating with the Internet.

Figure 5:
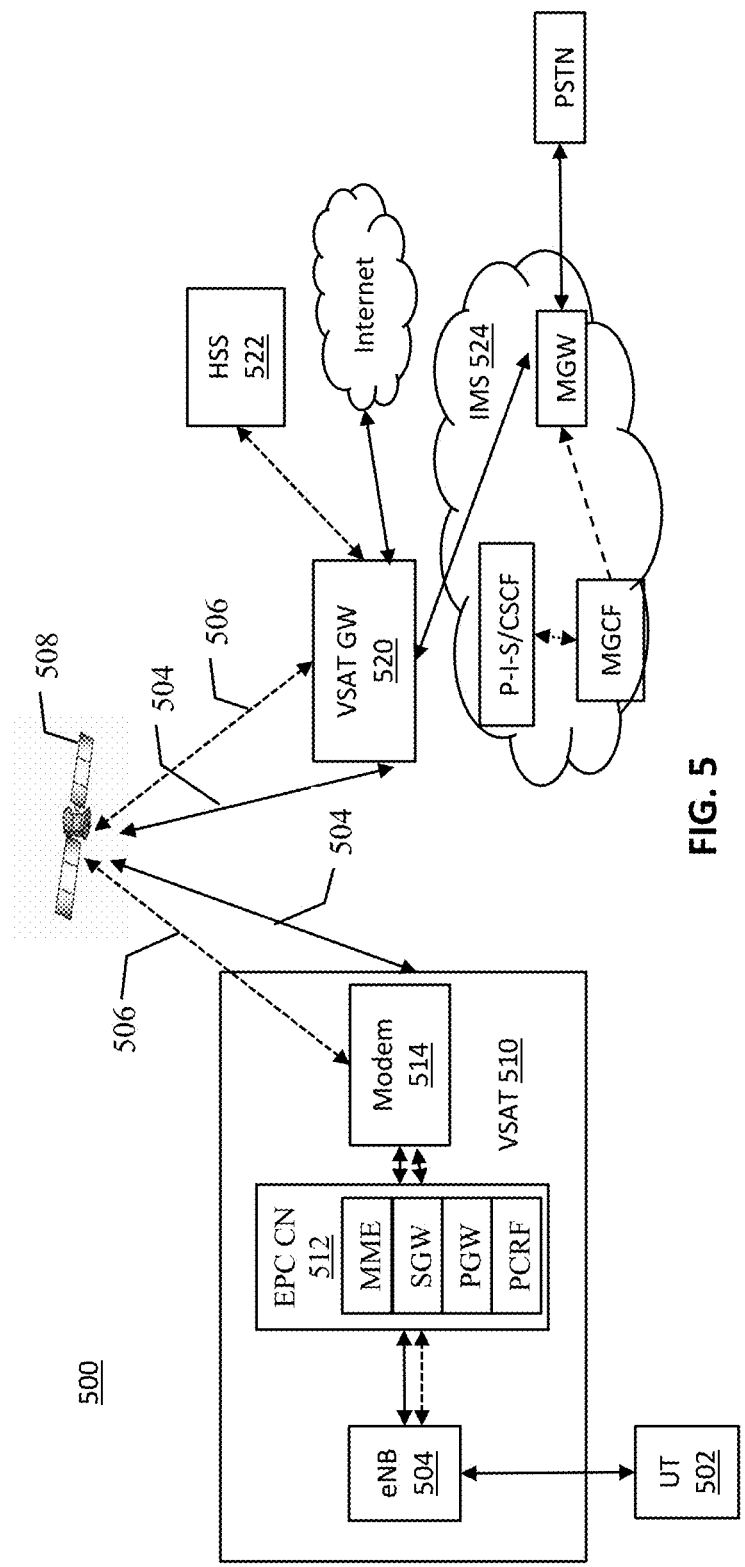
FIG. 5 illustrates a fully integrated eNB, EPC, and VSAT according to various embodiments.

FIG. 5 illustrates a cellular system including an eNB and an EPC CN device integrated into a VSAT according to various embodiments.

A cellular system 500 may provide cellular services to a User Terminal (UT) 502 connecting to an eNB 504, for example, a small-cell eNB. In some embodiments, the eNB 504 may be integrated into a VSAT 510 with a modem 514 and an EPC CN device 512. The modem 514 may be used for providing a satellite backhaul for the cell-site. The satellite backhaul may provide one or more satellite links 504, 506 using a satellite 508 as a relay to connect the modem 514 with a VSAT GW 520. The EPC CN device 512 may provide one or more of an MME, an SGW, a PGW, a PCRF or the like.

In exemplary embodiments, the VSAT GW 520 may provide voice traffic services for the UT 502 by communicating with an IMS 524. The IMS 524 may connect to a PSTN. In exemplary embodiments, the VSAT GW 520 forwards the signaling between various functions included in the EPC CN device 512 and the IMS or the HSS 522. In exemplary embodiments, the VSAT GW 520 forwards the signaling between an MME included in the EPC CN device 512 and the HSS 522 to access UT subscriptions stored in the HSS 522. In exemplary embodiments, the VSAT GW 520 may provide data services for the UT 502 by communicating with the Internet.

VSAT with Two Modem Transceivers

Figure 6:
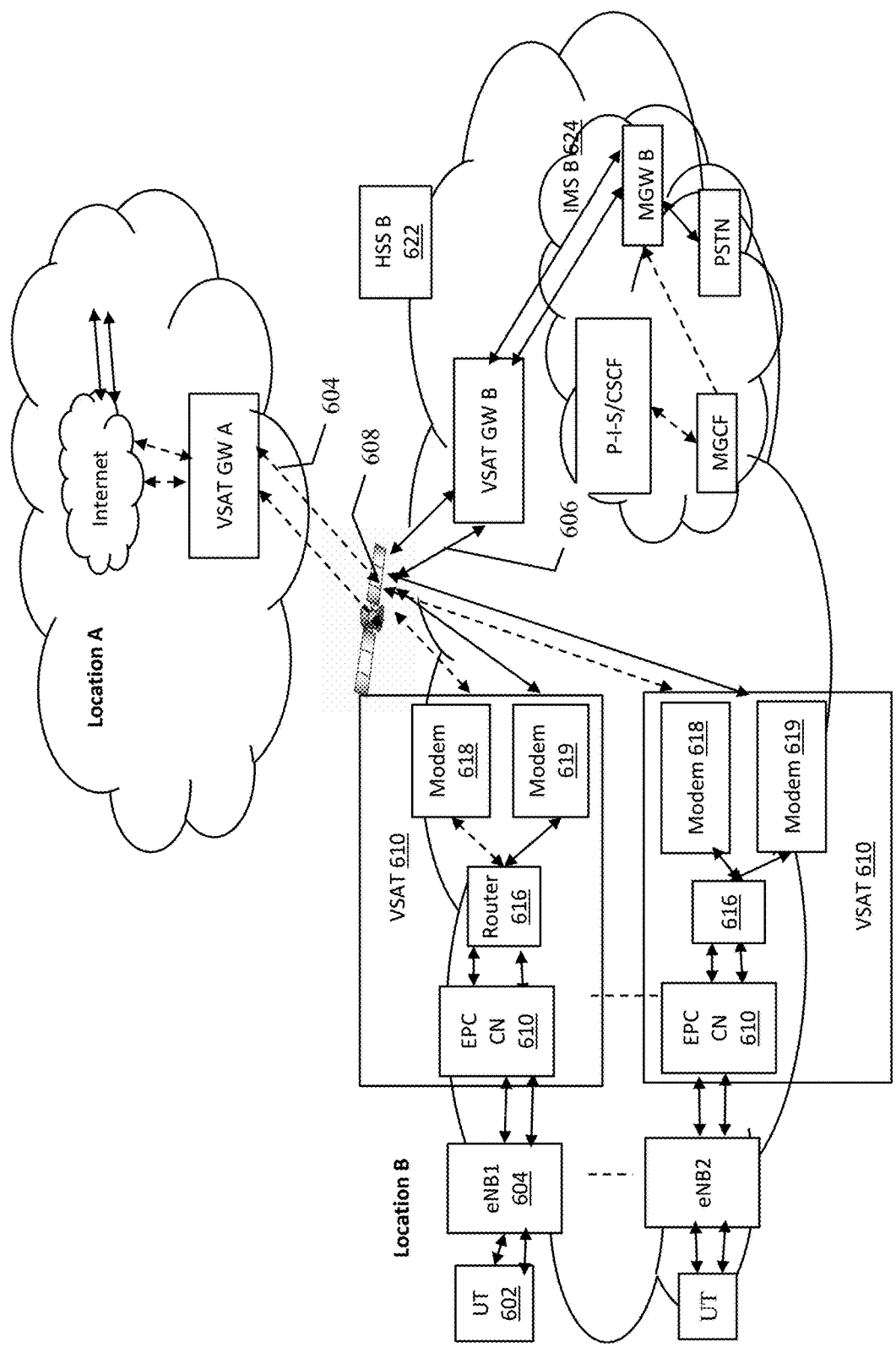
FIG. 6 illustrates a Satellite Backhaul VSAT with two Modem Transceivers and Embedded EPC Components according to various embodiments.

FIG. 6 illustrates a cellular system including an EPC CN device integrated into a VSAT according to various embodiments.

In exemplary embodiments, a separation of voice and data traffic may be desired. The separated traffic may be communicated to two different locations, for example, location A and location B. The two locations may be in different countries. In some embodiments, voice traffic may be communicated over a satellite link intra-country. In some embodiments, data traffic may be communicated over a satellite link inter-country.

A cellular system 600 may include a UT 602 communicating with an eNB 604 that is communicating with an EPC CN device 510. The EPC CN device 610 may be included in a VSAT 610 that may provide a footprint size reduction by including two modems or transceivers 618, 619. The second modem may be provided in conjunction with one or more of the above-mentioned VSAT integrations with LTE cellular components, for example, VSAT 310, VSAT 410, or VSAT 510. The VSAT 610 may include a router 616 to inspect and route the traffic to an appropriate VSAT GW. In exemplary embodiments, voice traffic and data traffic from the UT 602 may be routed to two different VSAT gateway disposed at different geographic locations or countries. For example, modem 618 may relay traffic via satellite 608 to a VSAT GW A. VSAT GW A may be used for relaying data traffic 604 (dashed lines in FIG. 6) to the Internet. Modem 619 may relay traffic via the satellite 608 to a VSAT GW B. VSAT GW B may be used for relaying voice traffic 606 (solid lines in FIG. 6) to an IMS B 624. In exemplary embodiments, IMS B 625 may be located in the same country as UT 602 to avoid long distance charges and the like.

Although the subject matter has been described in language specific to structural features and/or methodological acts, it is to be understood that the subject matter in the appended claims is not necessarily limited to the specific features or acts described above. Rather, the specific features and acts described above are disclosed as example forms of implementing the claims. Other configurations of the described embodiments are part of the scope of this disclosure. Further, implementations consistent with the subject matter of this disclosure may have more or fewer acts than as described or may implement acts in a different order than as shown. Accordingly, the appended claims and their legal equivalents should only define the invention, rather than any specific examples given.

We claim as our invention:

1. A Very Small Aperture Terminal (VSAT) to provide backhaul satellite communications for a cellular base station, the VSAT comprising:
   an Evolved Packet Core (EPC) Core Network (CN) device;
   a satellite modem connected to the EPC CN device and to communicate over a satellite link;
   a second satellite modem to communicate over a second satellite link with a data service; and
   a router to separate the user traffic into voice traffic and data traffic, to communicate the voice traffic with the satellite modem, and to communicate the data traffic over the second satellite modem,
   wherein the EPC CN device manages communication of user traffic from the cellular base station to the satellite modem.

2. The device of claim 1, wherein the satellite modem communicates signaling traffic from the cellular base station over the satellite link.

3. The device of claim 1, wherein the EPC CN device manages Internet Protocol (IP) address mapping for user traffic.

4. The device of claim 1, wherein the user traffic over the satellite link is communicated to one or more of an IP Multimedia Subsystem (IMS), a Public Switched Telephone Network (PSTN), a Home Subscriber Server (HSS), an external network, and an EPC service node.

5. The device of claim 1, wherein the EPC CN device comprises one or more of a Mobility Management Entity (MME), a Policy and Charging Rule Function (PCRF), a Packet Data Network Gateway (PGW) and a Serving Gateway (SGW).

6. The device of claim 1, wherein the cellular base station comprises an Evolved Node B (eNB).

7. The device of claim 1, wherein the cellular base station comprises a Long Term Evolution (LTE) base station.

8. A cellular system using backhaul satellite communications, the cellular system comprising:
   a cellular base station; and
   a Very Small Aperture Terminal (VSAT) comprising:
     an Evolved Packet Core (EPC) Core Network (CN) device, and
     a satellite modem connected to the EPC CN device and to communicate over a satellite link,
     a second satellite modem to communicate over a second satellite link with a data service, and
     a router to separate the user traffic into voice traffic and data traffic, to communicate the voice traffic with the satellite modem, and to communicate the data traffic over the second satellite modem,
   wherein the cellular base station is connected to the VSAT, and the EPC CN device manages communication of user traffic from the cellular base station to the satellite modem.

9. The system of claim 8, wherein the satellite modem communicates signaling traffic from the cellular base station over the satellite link.

10. The system of claim 8, wherein the EPC CN device manages Internet Protocol (IP) address mapping for user traffic.

11. The system of claim 8, wherein the user traffic over the satellite link is communicated to one or more of an IP Multimedia Subsystem (IMS), a Public Switched Telephone Network (PSTN), a Home Subscriber Server (HSS), an external network, and an EPC service node.

12. The system of claim 8, wherein the EPC CN device comprises one or more of a Mobility Management Entity (MME), a Policy and Charging Rule Function (PCRF), a Packet Data Network Gateway (PGW) and a Serving Gateway (SGW).

13. The system of claim 8, wherein the cellular base station comprises an Evolved Node B (eNB).

14. The system of claim 8, wherein the cellular base station comprises a Long Term Evolution (LTE) base station.

15. A Very Small Aperture Terminal (VSAT) to provide backhaul satellite communications, the VSAT comprising:
   an evolved Node B (eNB);
   a satellite modem connected to the eNB and to communicate over a satellite link;
   a second satellite modem to communicate over a second satellite link with a data service; and
   a router to separate the user traffic into voice traffic and data traffic, to communicate the voice traffic with the satellite modem, and to communicate the data traffic over the second satellite modem,
   wherein the eNB communicates signaling and user traffic to the satellite modem.

16. The device of claim 15, wherein the user traffic over the satellite link is communicated to one or more of an EPC CN device, an IP Multimedia Subsystem (IMS), a Public Switched Telephone Network (PSTN), a Home Subscriber Server (HSS), an external network, and an EPC service node.

17. The device of claim 15, wherein the eNB comprises a Long Term Evolution (LTE) base station.

* * * * *